United States Patent
Venostini

(10) Patent No.: US 11,896,142 B2
(45) Date of Patent: Feb. 13, 2024

(54) INSERT FOR A BABY BUCKET SEAT

(71) Applicant: Lauren Patricia Venostini, Toronto (CA)

(72) Inventor: Lauren Patricia Venostini, Toronto (CA)

( * ) Notice: Subject to any disclaimer, the term of this patent is extended or adjusted under 35 U.S.C. 154(b) by 46 days.

(21) Appl. No.: 17/503,821

(22) Filed: Oct. 18, 2021

(65) Prior Publication Data

US 2023/0120409 A1 Apr. 20, 2023

(51) Int. Cl.
*A47D 15/00* (2006.01)
*A47D 13/02* (2006.01)

(52) U.S. Cl.
CPC ......... *A47D 15/006* (2013.01); *A47D 13/025* (2013.01)

(58) Field of Classification Search
CPC .. A47D 13/025; A47D 15/006; B60N 2/2812; B60N 2/2839; B60N 2/2881; B60N 2/2842; B60N 2/2845
See application file for complete search history.

(56) References Cited

U.S. PATENT DOCUMENTS

| | | | |
|---|---|---|---|
| 3,799,606 A | 3/1974 | Gesslein | |
| 3,934,934 A * | 1/1976 | Farrell, Jr. | ............ B60R 22/105 D6/333 |
| 4,348,048 A | 9/1982 | Thevenot | |
| 4,802,244 A | 2/1989 | Mcgrath-Saleh | |
| 5,011,057 A | 4/1991 | Perruzza et al. | |
| 5,440,770 A | 8/1995 | Nichols | |
| 5,482,352 A * | 1/1996 | Leal | .......... B60N 2/28 297/219.12 |
| 6,145,932 A * | 11/2000 | Hamel-Nyhus | ...... B60N 2/2881 297/219.12 |
| 6,341,818 B1 * | 1/2002 | Verbovszky | ......... B60N 2/2881 297/219.12 |
| 6,467,840 B1 * | 10/2002 | Verbovszky | ......... B60N 2/2881 297/219.12 |
| 7,192,086 B2 * | 3/2007 | Davis | ....................... A47C 7/66 297/219.12 |
| 7,251,846 B1 | 8/2007 | Elkin et al. | |
| 7,350,253 B2 | 4/2008 | Simon | |
| 8,028,361 B2 | 10/2011 | Ramer et al. | |
| 10,874,230 B2 * | 12/2020 | Green | .................. B60N 2/2806 |
| 2005/0210580 A1 | 9/2005 | Clapper | |
| 2011/0148159 A1 * | 6/2011 | Barron | ..................... A47D 7/04 5/636 |

FOREIGN PATENT DOCUMENTS

DE 2707303 A1 8/1977

* cited by examiner

*Primary Examiner* — Milton Nelson, Jr.
(74) *Attorney, Agent, or Firm* — Brennan, Manna & Diamond, LLC

(57) ABSTRACT

Parents are always looking for ways to maximize the time spent on developing their baby's motor, communication, and sensory skills. The various embodiments of this invention gives parents a safe and secure alternative to the standard position of a baby while in an infant bucket seat. Baby can easily be turned around to experience all of the benefits of tummy time while parents shop, walk, or simply stay stationary.

18 Claims, 4 Drawing Sheets

INSERT FOR A BABY BUCKET SEAT

FIELD OF THE INVENTION

The present invention relates generally to the field of attachments for baby bucket seats, specifically for blanket-type attachments that can be fitted into baby bucket seats or strollers, more specifically to blanket-type attachments that facilitate baby tummy time.

BACKGROUND

Tummy time is an important one of baby's first exercises. Tummy time is time a baby spends awake on their stomach, and it is a crucial exercise for baby's motor, visual, and sensory development. Babies can begin Tummy time as a newborn and can continue throughout their first year. This type of exercise is crucial for the development of the core muscles of the neck, back, and shoulder muscles. It can also possibly help prevent early motor delays and conditions, such as flat head syndrome (positional plagiocephaly) and twisted neck (positional torticollis).

Once baby begins crawling, around 8-10 months, they will be getting the developmental benefits while moving, and it is not as essential to do tummy time exercise, however, it is still beneficial to have baby spend some time in the tummy time prone position.

Numerous baby restraining devices are known in the field, but none are specifically designed for safely holding baby in the correct prone position for aiding tummy time exercise.

U.S. Pat. No 4,802,244 (McGrath-Saleh) discloses a premature infant bedding construction. The apparatus comprises a means for receiving, holding and stabilizing the position of prematurely born infants. A bedding pad of particular configuration is adapted to receive the prone body of a prematurely born infant, such base or bedding pad having associated with it a U-shaped retainer, collar or peripheral wall. The prematurely born infant is thus stabilized in the optimum resting and sleeping posture. There is a loin cloth like harness longitudinally adjustable on the base pad and peripheral wall to fit and receive the diapered bottoms of prematurely born infants of varying size. Another object of the invention is to provide such a bedding tool for premature babies such as to always be used for and to maintain the baby optimally on his tummy or his side. By reversing the direction of the premature infant's position within the subject premature infant bedding construction, another use of the instant device may be provided whereby the five-pound discharge premature infant, or at least the older heavier premature infant may be carried in such a normal child's car seat utilizing the inverted subject bedding device. This apparatus is designed to accommodate a premature baby in the prone position for sleeping, or inverted for traveling front facing in a car seat. When used in conjunction with a car seat, it is the restraints of the car seat that keep the baby in position, not the harness of the apparatus.

U.S. Pat. Appl. 2005/0210580 (Clapper) discloses a child sleeping assembly with inclined sleeping surface. This child sleeping assembly includes a floorboard, an adjustable panel movably connected to the floorboard to move between a reclined position and an inclined position, a frame mounted to the floorboard, and a fabric enclosure mounted to the floorboard and the frame. The fabric enclosure has a sidewall and floor that defines an enclosed child sleeping area. The sidewall encircles the child sleeping area. The child sleeping assembly also can include an adjustment element connected to the floorboard and configured to travel in an adjustment track of the panel to control positioning of the panel between the reclined position and the inclined position. In the reclined position, the panel lies flush with the bassinet floorboard, creating a flat surface, and the child can lie in a supine position, or on his/her stomach on the mattress. Again, this is a sleeping assembly, not an apparatus to facilitate tummy time exercise.

U.S. Pat. No. 5,440,770 (Nichols) discloses an infant seat with opposite supporting surfaces. The infant support includes a generally wedge-shaped body portion which is adapted to alternatively support an infant in an upwardly-facing reclined position or a downwardly-facing inclined position. The adjustable harness comprises a sling and a plurality of adjustable strap members for releasably securing the harness to the body portion. The strap members are releasably secured to the body by means of conventional interlocking clasp members which are respectively attached to the body and the straps. The clasp is rotatably attached to the side of the body so that it is fully rotatable around 360° of motion and the clasp is slidably attached to the strap so that it is slidably adjustable along the length of the strap. In use, the sling is received over the torso of the infant and the strap members are adjusted for supporting the infant in a desired position. This device comprises a wedge-shaped structure, dissimilar to a bucket car seat, and the sling portion anchors directly to the wedge structure in such an orientation that tummy time exercise is difficult for the baby.

U.S. Pat. No. 7,350,253 (Simon) discloses an infant sleep support device simulating burping position. An infant sleep support device includes a semi-rigid curved support having head support, stomach support, and leg support surfaces covered by a padded cushion that simulates a mother's anatomy. Panties having elasticized waist and leg openings are secured to the curved support by straps, and are extended over the infant to secure the infant to the curved support. Shoulder straps may also extend over the infant's shoulders. The curved support is maintained by a frame member in an orientation that positions the head support surface horizontally. The frame member may suspend the curved support for rocking motion, and the curved support may be removably attached to such frame member. This device is designed as a sleep aid that supports a baby in a position similar to when the baby is lying on a parents' torso. The device is also designed to rock back and forth.

DE. Pat. No. 2,707,303 (Wetter) discloses a safety sling for baby in car having wide retaining belt and shoulder straps to hold child in prone position. The baby is supported in a scoop shaped, rigid container secured to the car seat by a strap looped through the carrying handles. A wide belt straps the baby into the scoop, and supports it over the whole length of the torso. Shoulder straps prevent the baby from wriggling out of the strap. The safety sling provides maximum support for the baby, in a prone position, with little chance of injury from the straps in a collision. This device related to a mode of transporting babies in vehicles, is such a way to prevent whiplash type injuries.

U.S. Pat. No. 5,011,057 (Perruzza et al.) discloses a baby carrier. A baby carrier is provided having a harness, and being adapted to support a baby in the prone position. The baby carrier of the invention comprises an elongate pouch to accommodate the baby, the pouch being located by the harness with respect to a person carrying the baby so that either elongate side of the pouch is adjacent the breast of the person. Openable flaps are provided in each pouch side to access the person's breast so that the baby may nurse. The flaps may be located so that the flap of one side accesses one breast and the flap of the other side accesses the other breast. The sides may be high enough to provide privacy shielding. This device is a carrying aid as opposed to a tummy time restraining device.

U.S. Pat. No. 4,348,048 (Thevenot) discloses an adjustable curved seat for infants. An adjustable boat-shaped seat for children, particularly usable as a car seat, includes a generally boat-shaped seat having armrests on each side thereof and generally arcuately-shaped slide guides integrally-molded to said seat on each side thereof adjacent to said armrests and a rigid frame upon which the seat rests. The frame includes two generally arcuately-shaped rails disposed generally parallel to the sides of the seat, each of which slidably rests upon and lies in front of, and above, one of the slide guides to permit movement of the seat between sitting and prone end positions. The orientation of the car seat does not allow for easy prone positioning required for tummy time exercise.

U.S. Pat. No. 8,028,361 (Ramer et al.) discloses an infant support device. An infant support device for supporting an infant in a prone position, comprising a base with a front, a back, a top, a bottom and two side members, said base having a support surface extending between the side members on the top of the base; the support surface being defined by two portions: a body support surface disposed proximate the front of the support device and terminating adjacent the front of the device, and a leg support surface extending rearwardly from terminus of the body support surface toward the back of the device; and having a grip for retaining the posterior side of the legs of the infant and extending upwardly from the support surface between the side members; wherein an infant is supported in a prone position on the support surface between the side members, and the legs are supported on the leg support surface and are retained by said grip to minimize infant rollover toward a supine position. This device retains baby in position be way of shaped rigid body supports, however the baby is not strapped in place.

U.S. Pat. No. 3,799,606 (Gesslein) discloses a baby carrier. A baby carriage body is provided with see-through means and means for selectively covering said see-through means. Such covering may be accomplished by a tiltable hood of opaque material. The wall of the carriage body may be hollow and inflatable. It is a further object of the invention to provide an improved baby carriage of a simple, yet sturdy design suitable especially for rearing babies in a face-down position.

U.S. Pat. No. 7,251,846 (Elkin et al.) discloses a harness for securing an infant to a reflux wedge. A harness for positioning and securing an infant to a reflux wedge. The harness includes a crotch support having a front flap and a rear flap connected to each other by a transverse section. Two straps extend upward from the rear flap. An infant is placed in the harness and secured to the reflux wedge. The infant's position (up or down) on the surface of the reflux wedge is fully adjustable. The straps are affixed to a horizontal slit found in the main body of the reflux wedge by hook and pile material. The straps are attached to each other by a material section. The harness prevents the infant from slipping down the slope of the wedge. The unique design of the wedge and harness allows for either prone or supine positioning of the infant. Infant shoulder protraction is facilitated in either the prone or supine position when the infant rests within the harness attached to the wedge. This harness is designed to keep the baby on optimal position to prevent gastroesophageal reflux disease, also known as GERD, which is a common ailment which results from a back flow (reflux) of acid from the stomach into the esophagus.

All documents cited herein are incorporated by reference.

None of the above cited documents, alone or in combination satisfy the need for a baby restraining device that is specifically designed for safely holding baby in the correct prone position for aiding tummy time exercise.

BRIEF SUMMARY

It is an object of the invention to provide a prone positioning or tummy time attachment for a baby bucket seat and method of using.

In accordance with an aspect of the invention there is provided an insert for a bucket seat, the insert configured to restrain a baby in the bucket seat in a prone position, the insert comprising: a fabric base layer sized and proportioned to cover and extend beyond all edges of the bucket seat, the base layer having an upper head region, a lower foot region and left and right sides; one or more mechanisms on the upper head region, to connect the base layer to a handle of the bucket seat when the handle is in a locked position; a sling comprising a shaped fabric inset that is sized and proportioned to cover a lower section of the back of the baby's torso, the inset having a lower edge permanently attached to a central section of the base layer, two leg shaped sections either side of the lower edge, and an upper edge abutting the leg shaped sections and extending across the baby's shoulders; two or more straps and clasps in cooperating attachment with the upper head region of the fabric base layer and the upper edge of the fabric inset of the sling.

In accordance with another aspect of the invention there is provided a method of securing a baby in a bucket seat, the method comprising: positioning the insert as described above over the bucket seat; connecting the one or more mechanisms on the upper head region, to the handle of the bucket seat when the handle is in the locked position; placing the baby in a prone position in the bucket seat with baby's feet and legs will in a base of the bucket seat and baby's chest against the upper head region; passing the sling between baby's legs, covering bottom and lower back area; clipping the two or more straps and clasps in cooperating attachment with the upper head region of the fabric base layer and the upper edge of the fabric inset of the sling with one of the two or more straps and clasps over baby's left shoulder and one of the two or more straps and clasps over baby's right shoulder; and adjusting the two or more straps and clasps to form a secure restraining system around the baby.

The advantages and features of the present invention will become better understood with reference to the following more detailed description and claims taken in conjunction with the accompanying drawings in which like elements are identified with like symbols.

To easily identify the discussion of any particular element or act, the most significant digit or digits in a reference number refer to the figure number in which that element is first introduced.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Devices and methods for carrying out the invention are presented in terms of embodiments depicted within the FIGS. However, the invention is not limited to the described embodiments, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and the configurations shall be shown and described for purposes of clarity and disclosure and not by way of limitation of scope.

Embodiments of the invention as disclosed herein relates to a sling/insert with straps to hold a baby safely in place to attach to an infant bucket seat so baby can be placed and safely secured in the prone position on his or her tummy while in the stroller. It includes a fabric sling/insert/attachment/add-on-accessory for a baby/infant bucket seat/stroller. The bucket seat insert allows baby to rest on his/her tummy/belly/stomach and obtain valuable tummy time exercise. The bucket seat insert may include a flap to wrap around and be secured to the handle of bucket seat, fastened in place by hook and loop fasteners such as Velcro™. The baby is secured to the fabric attachment via a sling and adjustable straps. Additionally, there are attachment members to allow teething toys to be fastened to the bucket seat or stroller attachment.

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

Figure 1:
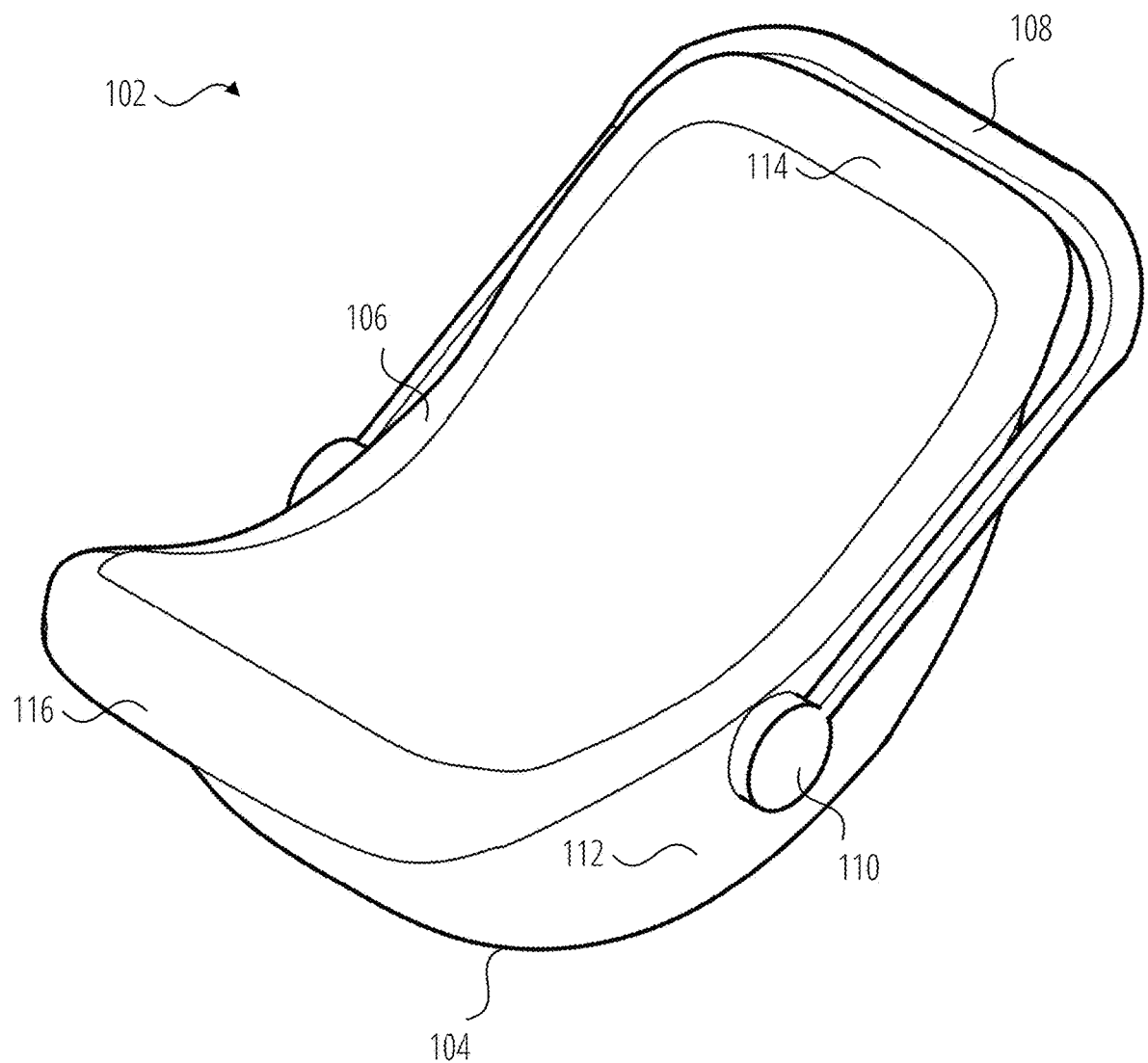
FIG. 1 illustrates a perspective aspect of a typical baby bucket seat, for use in conjunction with one embodiment of the invention.

FIG. 1 illustrates a typical baby bucket seat 102. These bucket seats 102 can be used to strap a baby into the seat and carry it in a vehicle, or they can be used to transport a baby attached to a stroller base.

Bucket seats 102 typically comprise a base 104 a rim 106 that surrounds the bucket seat 102. A handle 108 is rotatably attached to the main body 112 at a fixing point 110. The handle 108 has two operative positions: vertically aligned for carrying, and locked down around the head region 114 of the bucket seat 102, as shown.

Figure 2:
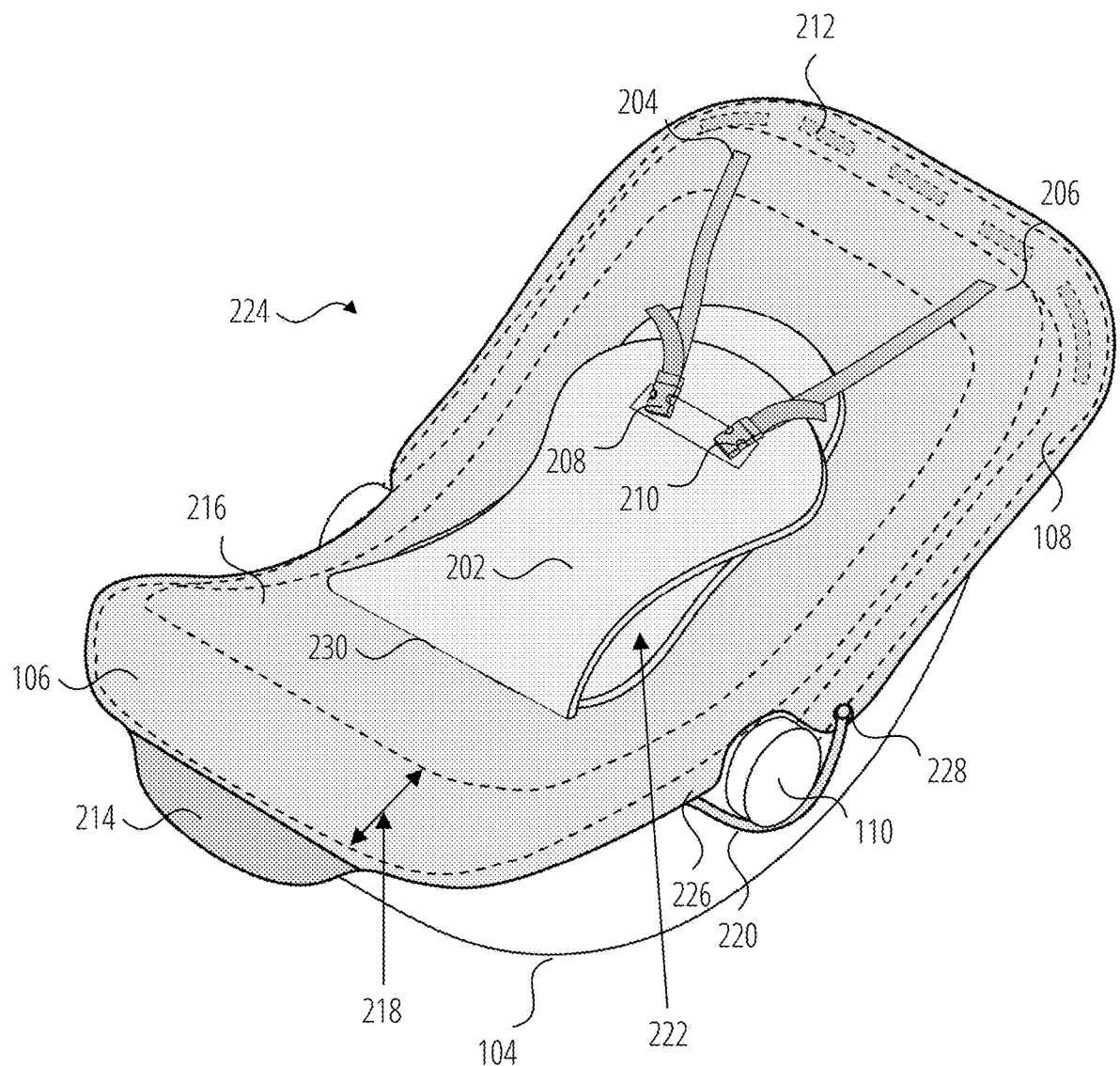
FIG. 2 illustrates a perspective aspect of the attachment in accordance with one embodiment of the invention fitted onto a baby bucket seat.

FIG. 2 illustrates an embodiment of the bucket seat insert 224.

The fabric base layer 216 can be seen extending over the bucket seat 102. In this embodiment of the invention, the fabric base layer 216 is affixed to the bucket seat 102 in three places.

Firstly, a series of spaced apart co-operatingly positioned releasable fastenings, such as hook and loop fasteners 212 are positioned around the upper head region 114 of the bucket seat 102. The section of fabric between one of spaced apart co-operatingly positioned releasable fastenings is wrapped around the handle 108 and fastened in place to the opposing fastener. This is repeated for all of the hook and loop fasteners 212. The handle is then locked into its position around the head region 114.

The second and third points of attachment are provided for by handle straps 220. The handle straps 220 are typically affixed via a permanent attachment 226 to the fabric base layer 216 at one end and have a releasable attachment 228 at the other end. The length of the handle straps 220 are such that they extend from the permanent attachment 226 point, around the handle 108 of the bucket seat 102, and fasten to a cooperating releasable attachment 228 fastener positioned on the fabric base layer 216.

The fabric base layer 216 has a sling 202 that is affixed to a central portion of the fabric base layer 216 via a permanent connection 230. In one embodiment of the invention, the sling 202 has a left shoulder strap 204 and a right shoulder strap 206 that are releasably connected to the sling 202 via first clasp 208 and a second clasp 210.

In some embodiments of the invention, padded seams 218 surround the rim 106 of the bucket seat 102, and a padded tummy section 222 may be present.

Additional embodiments of the invention include a weighted section 214 to counter balance the weight of the baby when in the prone position. In this embodiment, the weighted section 214 is shown at the lower or foot section 116 of the bucket seat 102. In other embodiments, the weighted section 214 can be towards the central section of the bucket seat insert 224. The weighted section of the insert or attachment can comprise a smooth heavy object that can be inserted into a resealable pocked positioned at an appropriate position to counter-balance a baby in a prone position in the bucket seat. The weighted object can thereby easily be removed from the attachment for washing.

Figure 3:
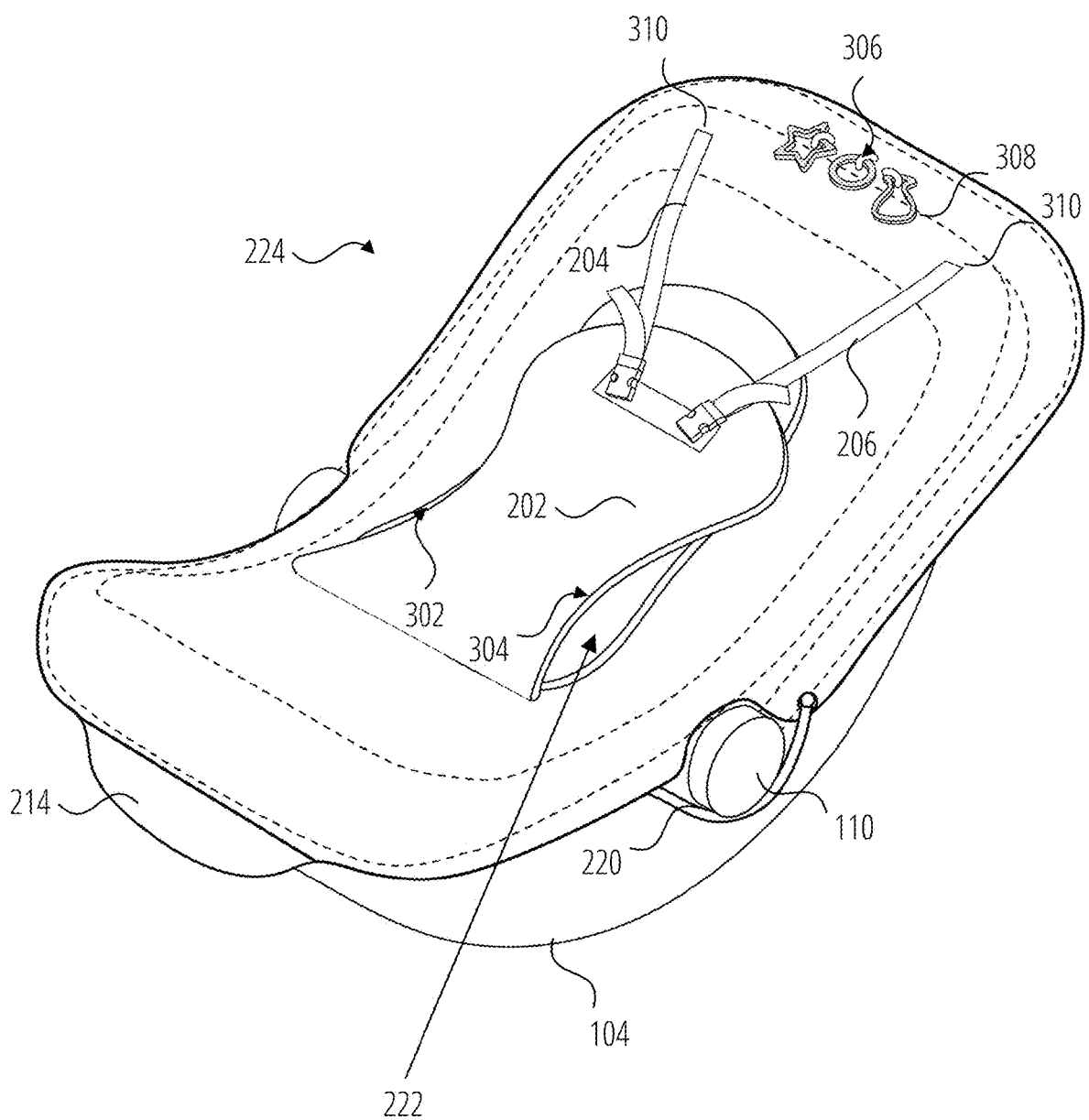
FIG. 3 illustrates a perspective alternative aspect of the attachment in accordance with one embodiment of the invention fitted onto a baby bucket seat.

FIG. 3 illustrates an alternative embodiment of the invention.

The features of this embodiment include the sling 202 having a left leg opening 302 and a right leg opening 304. These openings are positioned on either side of the permanent connection 230 of the sling 202 to the central portion of the fabric base layer 216.

The left shoulder strap 204 and right shoulder strap 206 are permanently affixed to the fabric base layer 216 by fixed connections 310. The left shoulder strap 204 and right shoulder strap 206 are adjustable in length by moving the buckles that are situated close to the first clasp 208 and second clasp 210.

Figure 4:
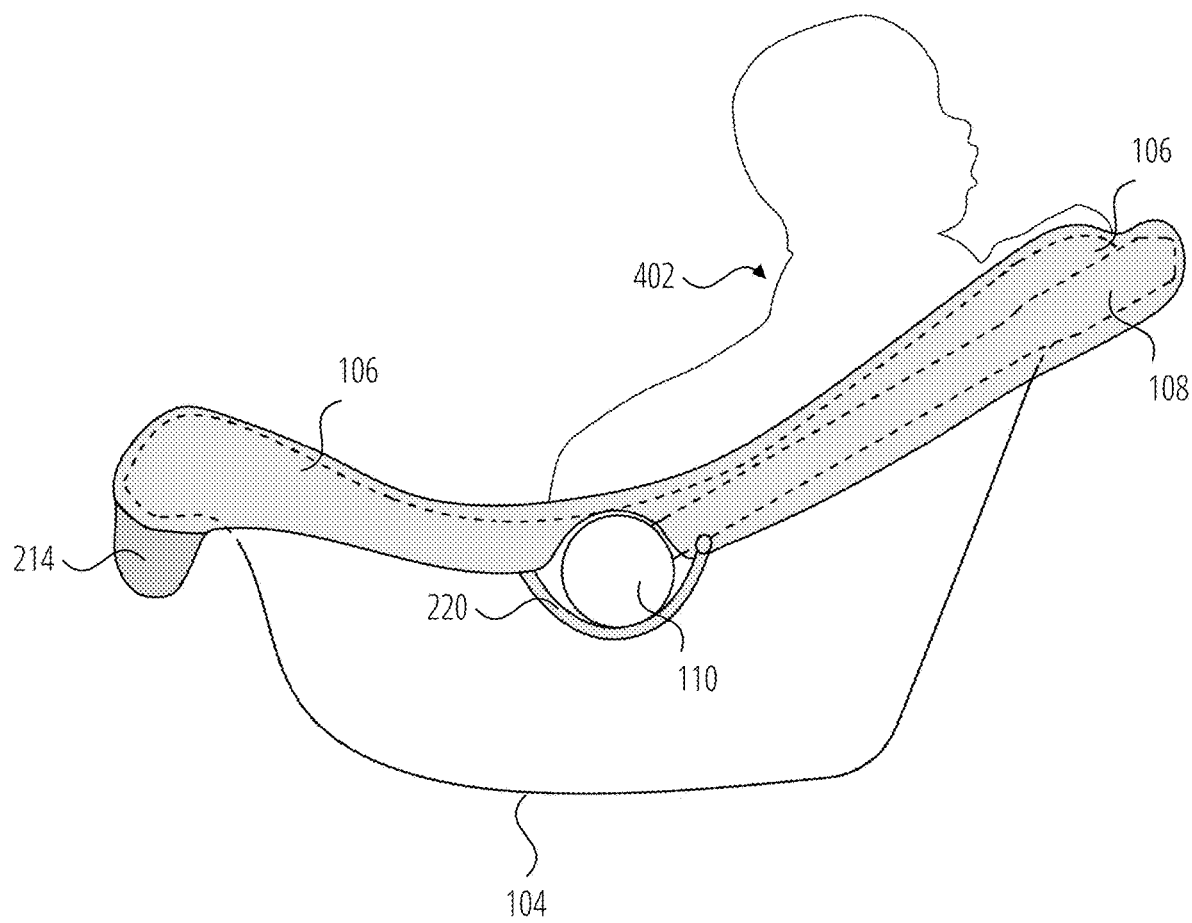
FIG. 4 illustrates a side view of an aspect of the subject matter in accordance with one embodiment of the invention.

FIG. 4 illustrates a side view of a baby in the baby in prone position 402 in the bucket seat 102.

the fabric base layer 216 is affixed to the bucket seat 102 via the handle straps 220 and the hook and loop fastener 212 (not shown) around the handle 108, with the handle 108 in the locked position.

The weighted section 214 can be seen at attached to the fabric base layer 216 in the lower or foot section 116.

The bucket seat insert easily attaches to any brand of infant bucket seat by one or more releasable fasteners. These fasteners include numerous mechanisms known to those of skill in the field including, but not limited to: hook and loop fasteners such as Velcro™; poppers; hooks and eyes; push fit clasps; and ties. It is made from a lightweight material that easily folds up and packs away (comes in its own small travel bag). It provides baby with a safe and secure tummy time experience while in the stroller. It is designed for babies from 2-10 months depending on developmental status, although 3-7 months is typically the optimal range. The insert may optionally come with teething connection members 306 to attach teething toys to further optimize time spent in the tummy traveler.

The bucket seat insert fits inside the infant bucket seat and safely and securely holds a baby in place while on his or her tummy. The canopy and handle of the bucket seat would be pulled back and baby would be on the tummy on an incline with the head hovering above the back of the bucket seat. The handle of the bucket seat must be in a locked position. The bucket seat insert would be underneath baby and wrapped around the handle, secured by the releasable fasteners. The baby would be buckled into the insert for safe cruising while in the stroller. Arms are up either underneath baby's chin or stretched out in front of the baby. Legs are down so that the feet can rest in the space where baby's bottom would be if he/she were sitting in the bucket seat. Babies within the above age ranges are typically teething. The area of the bucket seat insert where baby's face would rest could come equipped with space for teething toys to be attached so baby can optimize the time spent in the tummy traveler bucket seat 102.

In use, the attachment or insert is positioned over the bucket seat 120. The upper or head region 114 of the insert is wrapped around the handle 108 of the bucket seat 102 and secured in place using the hook and loop fasteners 212. The handle straps 220 are then secured around the handle 108 close to the fixing points 110. The weighted section 214, is positioned at an appropriate position, such as at around the central section of the insert, or at the lower or foot section 116 of the bucket seat 102. The baby is placed in the prone or tummy-time position in the bucket seat 102. Baby's feet and legs will be in the base of the bucket seat 102 and baby's chest will be against the head region 114. The sling 202 will be passed between baby's legs, covering the bottom and lower back area, then secured in place by clipping the first clasp 208 to the left shoulder strap 204 and the right shoulder strap 206 to the and second clasp 210. The lengths of the shoulder straps can be adjusted to form a secure restraining system around the baby.

The foregoing descriptions of specific embodiments of the present invention have been presented for purposes of illustration and description. They are not intended to be exhaustive or to limit the invention and method of use to the precise forms disclosed. Many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. An insert for a bucket seat, the insert configured to restrain a baby in the bucket seat in a prone position, the insert comprising:

a fabric base layer sized and proportioned to cover and extend beyond all edges of the bucket seat, the base layer having an upper head region, a lower foot region and left and right sides;

one or more mechanisms on the upper head region, to connect the base layer to a handle of the bucket seat when the handle is in a locked position;

a sling comprising a shaped fabric inset that is sized and proportioned to cover a lower section of the back of the baby's torso, the inset having a lower edge permanently attached to a central section of the base layer, two leg shaped sections either side of the lower edge, and an upper edge abutting the leg shaped sections and adapted to extend across the baby's shoulders;

two or more straps and clasps in cooperating attachment with the upper head region of the fabric base layer and the upper edge of the fabric inset of the sling.

2. The insert of claim 1, wherein the one or more mechanisms on the upper head region comprise cooperating releasable fasteners.

3. The insert of claim 2, wherein the cooperating releasable fasteners are selected from the group comprising: hook and loop fasteners; poppers; hooks and eyes; push fit clasps; and ties.

4. The insert of claim 2, wherein the cooperating releasable fasteners are attached to the upper head region of the base layer in spaced apart relationship to accommodate the handle of the bucket seat when the releasable fasteners are fastened.

5. The insert of claim 1, wherein a handle strap is permanently attached at a first end to each of the left and right sides of the base layer.

6. The insert of claim 1, wherein the two or more straps and clasps comprise a first strap that is permanently affixed to a left side of the upper head region at one end and has a releasable clasp affixed to an opposing end, and a second strap that is permanently affixed to a right side of the upper head region at one end and has a releasable clasp affixed to an opposing end, corresponding clasps are attached to the upper edge of the sling.

7. The insert of claim 6, wherein the first strap and the second strap are adjustable in length.

8. The insert of claim 1, wherein the fabric base layer is padded.

9. The insert of claim 1, wherein the fabric base layer is elasticated to engage with edges of the bucket seat.

10. The insert of claim 1, wherein the base layer and sling are made from washable fabric.

11. The insert of claim 1, wherein a weighted section is attached the base layer.

12. The insert of claim 11, wherein the weighted section is attached to the lower foot region of the base layer.

13. The insert of claim 11, wherein the weighted section is removable.

14. The insert of claim 1, further having one or more teething connection members affixed to the upper head region of the base layer.

15. The insert of claim 14, wherein the one or more teething connection members are configured to releasably attach one or more teething toys.

16. A method of securing a baby in a bucket seat, the method comprising:

positioning the insert of claim 1 over the bucket seat;

connecting the one or more mechanisms on the upper head region, to the handle of the bucket seat when the handle is in the locked position;

placing the baby in a prone position in the bucket seat so that baby's feet and legs will be positioned in a base of the bucket seat and baby's chest will be positioned against the upper head region;

passing the sling between baby's legs, covering bottom and lower back area;

clipping the two or more straps and clasps in cooperating attachment with the upper head region of the fabric base layer and the upper edge of the fabric inset of the sling with one of the two or more straps and clasps over baby's left shoulder and one of the two or more straps and clasps over baby's right shoulder; and adjusting the two or more straps and clasps to form a secure restraining system around the baby.

17. The method of claim 16, further comprising attaching a handle strap on the right side of the base layer to the handle of the bucket seat, and attaching a handle strap on the left side of the base layer to the handle of the bucket seat.

18. The method of claim 16, wherein a weighted section attached to the lower foot region of the base layer is positioned over the lower foot region of the bucket seat.

* * * * *